(12) United States Patent
Zahalka et al.

(10) Patent No.: US 6,385,332 B1
(45) Date of Patent: May 7, 2002

(54) AUTOMATED SEGMENTATION METHOD FOR 3-DIMENSIONAL ULTRASOUND

(75) Inventors: Abir Zahalka; Aaron Fenster, both of London (CA)

(73) Assignee: The John P. Roberts Research Institute, London (CA)

(*) Notice: Subject to any disclaimer, the term of this patent is extended or adjusted under 35 U.S.C. 154(b) by 0 days.

(21) Appl. No.: 09/253,384

(22) Filed: Feb. 19, 1999

(51) Int. Cl.$^7$ .................................................. G06K 9/00
(52) U.S. Cl. ...................................... 382/128; 128/922
(58) Field of Search ................................ 382/128, 256, 382/242, 129, 130, 131, 132, 173; 600/443

(56) References Cited

U.S. PATENT DOCUMENTS

| | | | |
|---|---|---|---|
| 5,187,658 A | * 2/1993 | Cline et al. | 382/128 |
| 5,457,754 A | * 10/1995 | Han et al. | 382/128 |
| 5,559,901 A | * 9/1996 | Lobregt | 382/256 |
| 5,662,113 A | * 9/1997 | Liu | 600/443 |
| 6,047,080 A | * 4/2000 | Chen et al. | 382/128 |

OTHER PUBLICATIONS

Steinke, et al., Three–dimensional Ultrasound Imaging of Carotid Artery Plaque, *Journal of Cardiovascular Technology*, vol. 8, No. 1, pp. 15–22 (1989).
Gonzales et al., Digital Image Processing, *Addison–Wesley Publishing Company*, Second Edition, pp. 369–373 (1987).
Sherebrin, et al., Freehand Three–Dimensional Ultlrasound: Implementation and Application, *SPIE*, vol. 2708, pp. 296–303 (1996).
Terzopoulos, et al., Sampling and Reconstruction with Adaptive Meshes, Proceeings of the Conference on Computer Vision and Patterns Recognition, pp. 70–75 (1991).
Fenster, et al., 3–D Ultrasound Imaging: A Review, *IEEE Engineering in Medicine and Biology*, pp. 41–51 (1996).

Barnett, et al., Beneficial Effect of Carotid Endarterectomy In Symptomatic Patients With High–Grade Carotid Stenois, *The New England Journal of Medicine*, vol. 325, No. 7, pp. 445–453 (Aug. 1991).
I. Dehaene, et al., MRC European Carotid Surgery Trial: Interim Results For Symptomatic Patients With Severe (70–90%) Or with Mild (0–29%) Carotid Stenosis, *The Lancet*, vol. 337, No. 8752, pp. 1235–1243 (May 1991).
Gorelick, Philip B., MPH, FACP, Stroke Prevention. An Opportunity for Efficient Utilization of Health Care Resources During The Coming Decade, *Stroke*, vol. 25, No. 1, pp. 220–224 (Jan. 1994).
McInerney, Tim, et al., Deformable Models In Medical Image Analysis: A Survey, *Medical Image Analysis*, vol. 1, No. 2, pp. 91–108 (1996).
Chen, Yang, et al., Description of Complex Objects From Multiple Range Images Using An Inflating Balloon Model, *Computer Vision and Image Understanding*, vol. 61, No. 3, pp. 325–334 (May 1995).
Young, Ian T., et al., Recursive Implementation Of The Gaussian Filter, *Signal Processing*, vol. 44, pp. 140–151 (1995).

(List continued on next page.)

Primary Examiner—Joseph Mancuso
Assistant Examiner—Abolfazl Tabatabai
(74) Attorney, Agent, or Firm—Fulwider Patton Lee & Utecht, LLP

(57) ABSTRACT

An ultrasound segmentation method comprising the steps of automated initial contour identification, followed by application of a geometrically deformable model (GDM). The formation of the initial contours involves the input of a single seed point by the user, and has been found to be insensitive to the placement of the seed within a structure. The GDM minimizes contour energy, providing a smoothed final result, with only three simple parameters being required as easily selectable input values.

10 Claims, 14 Drawing Sheets

OTHER PUBLICATIONS

Bouman, Carolien J., et al., Evaluation of Segmentation Algorithms For Intravascular Ultrasound Images, *Lecture Notes in Computer Science*, vol. 1131, pp. 203–212 (1996).

Carrascal, Francisco M., et al., Automatic Calculation Of Total Lung Capacity From Automatically Traced Lung Boundaries In Postero–Anterior And Lateral Digital Chest Radiographs, *Medical Physics*, vol. 25, No. 7, pp. 1118–1131 (Jul. 1998).

Duryea, Jeff, et al., A Fully Automated Algorithm For The Segmentation of Lung Fields On Digital Chest Radiographic Images, *Medical Physics*, vol. 22, No. 2, pp. 183–191 (1995).

Miller, James V., et al., Geometrically Deformed Models: A Methods For Extracting Closed Geometric Models From Volume Data, *Computer Graphics*, vol. 25, No. 4, pp. 217–226 (Jul. 1991).

Arbeille, Ph., MD, PhD, et al., Quantification and Assessment of Carotid Artery Lesions: Degree of Stenosis and Plaque Volume, *Journal of Clinical Ultrasound*, vol. 23, No. 2, pp. 113–124 (Feb. 1995).

Hatsukami, Thomas S., et al., Echolucent Regions In Carotid Plaque: Preliminary Analysis Comparing Three–Dimensional Histologic Reconstructions To Sonographic Findings, *Ultrasound in Medicine and Biology*, vol. 20, No. 8, pp. 743–749 (1994).

McPherson, David D., Three–Dimensional Arterial Imaging, (Not Dated).

Lobregt, Steven, et al., A Discrete Dynamic Contour Model, *IEEE*, pp. 12–24 (1995).

Kass, Michael, et al., Snakes: Active Contour Models, *International Journal of computer Vision*, pp. 321–331 (1988).

\* cited by examiner

AUTOMATED SEGMENTATION METHOD FOR 3-DIMENSIONAL ULTRASOUND

FIELD OF THE INVENTION

This invention relates in general to medical imaging, and more particularly to an improved segmentation method for 3-dimensional ultrasound (3-D US).

BACKGROUND OF THE INVENTION

The utility of ultrasonography in the diagnosis and assessment of carotid disease is well established. Because of its non-invasive nature and continuing improvements in image quality and Doppler information, ultrasonography is becoming increasingly popular in such applications. In 1991, the NASCET results demonstrated that an angiographic stenosis of $\geq 70\%$ selected a group of patients that benefited from carotid endarterectomy, but no equivalent Doppler measurement could satisfactorily select this group (see R. N. Rankin, A. J. Fox, K. Thorpe, and NASCET collaborators, "Carotid ultrasound: correlation with angiography in a multicenter trial," presented to the American Society of Neuroradiology, St. Louis: May 31–Jun. 5 (1992)). Although the role of ultrasound as a screening tool is well established, its role as the only definitive diagnostic test in assessing risk for stroke before surgery is very controversial and subject to heated debate. Nevertheless, there is agreement that factors related to the flexibility of ultrasonography and its high machine and operator dependence have contributed to disappointing results in some tests and trials. Non-standardized techniques and improper choice of equipment yield variable results, particularly in multi-center trials. In addition, measurement choices have in some circumstances been other than optimal. Flow-velocity-based measurements of stenosis severity are subject to a great deal of variability due to measurement location and angle uncertainty, as well as variations in operator skill. These variabilities and inaccuracies are further increased because the measurement of a single velocity vector component at one or two locations in a vessel constitutes only an indirect measure of the risk of stroke.

It has been speculated that 3-D US with real-time visualization of plaque and its surface, as well as 3-D measurements of the stenosis and the actual atheroma volume would reduce the variability of carotid disease assessment and improve diagnosis (see (1) T. S. Hatsukami, B. D. Thackray, and J. F. Primozich, "Echolucent regions in carotid plaque: Preliminary analysis comparing three-dimensional histologic reconstructions to sonographic findings," Ultrasound Med & Biol 20, 743–749 (1994); (2) P H Arbeille, C. Desombre, B. Aesh. M. Philippot, and F. Lapierre, "Quantification and assessment of carotid artery lesions: degree of stenosis and plaque volume," J Clin Ultrasound 123, 113–124 (1995); (3) W. Steinke, and M. Hennerici, "Three-dimensional ultrasound imaging of carotid artery plaques," Journal of Cardiovascular Technology 8, 15–22 (1989); and (4) D. D. McPherson, "Three-dimensional arterial imaging," Scientific American Science & Medicine 22–31, (March/April 1996)).

In addition, 3-D imaging of plaque may also allow quantitative monitoring of plaque development (such as changes in volume and morphology), provide important information about the natural history of atheroma growth, and help in the identification of those plaques which represent a risk of giving rise to stroke.

With a 3-D ultrasound image of the carotid arteries, important information about the vessels, which previously was difficult or impossible to obtain accurately and reliably, can now be ascertained after examination of a patient. In the measurement of the stenosis, the diagnostician can step through the 3-D image, one slice at a time, and outline the edges of the vessel wall. Counting the number of pixels enclosed within the trace and multiplying by the area of a pixel gives the cross-sectional area of the vessel. However, this manual process is highly labour intensive and operator dependent. It has been recognized that a preferable approach is to utilize automatic segmenting of the vessel.

Much work has been reported on the semi-automated segmentation of ultrasound images. This includes work on left ventricle boundary detection in echocardiographic images, ovarian follicle extraction, and intravascular ultrasound segmentation. While many of these studies have produced useful results, nearly all require the user to specify an initial contour, giving rise to inconsistent and mixed results from user to user. Additionally, most are computationally intensive and cannot be practically applied to a large 3-D image.

SUMMARY OF THE INVENTION

According to the present invention, an automated segmentation method is provided for three-dimensional vascular ultrasound images. The method includes two steps: an automated initial contour identification, followed by application of a geometrically deformable model (GDM). The formation of the initial contours involves the input of a single seed point by the user, and has been found to be insensitive to the placement of the seed within a structure. The GDM minimizes contour energy, providing a smoothed final result, with only three simple parameters being required as easily selectable input values. The method according to the present invention is fast (capable of performing segmentation on a 336×352×200 volume in 25 seconds when running on a 100 MHz 9500 Power Macintosh prototype) and involves minimal user interaction and minimal processing. The inventive method addresses the prior art problem of variability created through user interaction, particularly due to the definition of initial contours and the choice of threshold parameters.

BRIEF DESCRIPTION OF THE DRAWINGS

In the accompanying drawings which illustrate a working embodiment of the invention:

FIG. 6 shows an example of the results of applying the automated segmentation method according to the present invention, wherein FIG. 6(b) is a plot of the initial contour, and FIG. 6(c) is a plot of the final contour.

FIG. 7 shows the effect of the GDM application step on contour energy in a 60% stenosed phantom vessel at a point above the bifurcation, wherein FIG. 7(b) shows the initial contour prior to application of the GDM step, and FIG. 7(c) shows the final contour after the last iteration.

FIG. 11 shows the effects of GDM resolution on the contours at a point above the bifurcation in the 60% stenosed phantom, wherein FIG. 11(a) shows an initial contour before application of the GDM.

DESCRIPTION OF THE PREFERRED EMBODIMENT

Figure 1:
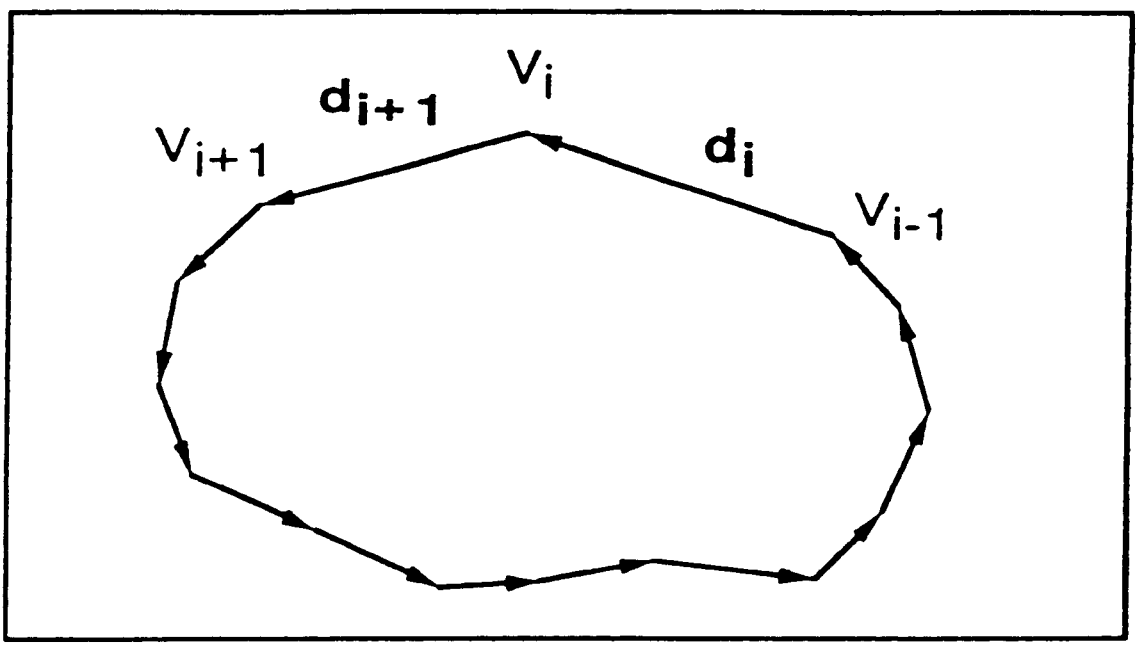
FIG. 1 is a schematic representation of the Geometrically Deformed Model (GDM) of a closed contour formed from a series of vertices connected by vectors.

Before describing the preferred embodiment and best mode of the invention, prior art methodologies of active contour models and GDM are presented briefly herein since aspects of these methodologies are incorporated into the automated segmentation method according to the present invention.

Segmentation involves separating an image into its constituent parts. Many techniques are known in the art, some of which have been described briefly above. However, nearly all such prior art techniques utilize a limited number of basic methods including gradient operators, intensity thresholding, template matching, and region-based analysis such as region growing (see R C Gonzalez and P. Wintz, *Digital Image Processing*, (Addison-Wesley, Reading, Mass., 1987)). These techniques rely either on changes in intensity across a boundary (local operators), or on the similarities of the region within a boundary (regional operators).

In medical imaging, a wide diversity of structures may be encountered with little regularity, even within the same class of structures. Although organ images of different individuals are similar, individual and pathological differences increase the diversity. This makes it difficult to find a general representation for the structures using fixed features or templates. Traditional edge detectors are even less useful in ultrasound imaging where speckle, shadowing, and other intrinsic noise and image artifacts degrade the image quality. Detectors that rely on local operators such as gradient, are highly sensitive to noise and artifacts. Region-based operators are less sensitive, however, they can be biased by discontinuities in the data or by gradual changes in contrast, such as from shadowing. Each approach relies on different properties of the image, but no technique alone is satisfactory in boundary identification and segmentation. When the properties of local and regional detectors are combined, such as in the active contour and the geometrically deformable models, the quality of the analysis can be improved.

A. Active Contour Models

The "snake" active contour model was first introduced by Kass et al (see M Kass, A. Witkin, and D. Terzopoulos, "Snakes: active contour model," International Journal of Computer Vision 1, 4:321–331 (1988)) thereafter refined by others. The "snake" active contour model is one of the most widely used segmentation methods presently in existence, This method is well suited for applications where the object of interest has a natural, continuous, and smooth contour, as often found in medical images. Generally speaking, the models are semi-automated, requiring the user to provide an initial close estimate of the contour within the true contour boundaries. This initial contour can be interpreted to contain the regional information. The curve evolves through a series of deformations as influenced by the attraction of external forces of nearby image features such as edges and lines, while simultaneously maintaining smoothness constraints on the evolving shape of the contour, which is controlled by the internal forces within the contour. The internal forces are a function only of the curvature of the contour, and the goal is to minimize the overall curvature while still maintaining a degree of rigidity.

The first generation of snake models (and the most common) uses the normalized arc length s to parameterize an initial curve as $v(s)=(x(s),y(s))$, where s varies from 0 to 1 along the curve and $x(s)$ and $y(s)$ are the corresponding coordinate points along its length. The total force, $F_{total}$, acting on the contour is the sum of the internal and external forces:

$$F_{total} = \int_0^1 [F_{int}(v(s)) + F_{ext}(v(s))] ds$$

The internal force, $F_{int}$ usually defined by a combination of the first and second derivatives along the curve. The first derivative ensures that the contour remains continuous and flexible (like a rubber band), while the second derivative imposes a degree of stiffness, keeping the contour smooth and preventing it from collapsing upon itself. The external force, $F_{ext}$ is a function of the image properties, usually defined as the local gradient at each point along the curve. The curve's evolution is guided by the solution that minimizes the total acting forces. The solution is obtained iteratively, and is generally solved through variational calculus methods. The contour slowly approaches the true boundary, with each point along the contour adjusted during each iteration. The optimal solution is mathematically intensive and computationally slow.

Other drawbacks to prior art active contour models include their sensitivity to the initial contour, as well as to the numerous parameters, which must be chosen by the user. If the initial contour is too far from the object edges, the contour will not be attracted by the distant gradients.

B. Geometrically Deformable Models

Geometrically Deformable Models (GDMs), introduced by Miller et al., are a different class of active contour models which avoid some of these complexities (see J. V. Miller, D. E. Breen, W. E. Lorensen, R. M. O'Bara, and Wozny M J, "Geometrically deformed models: a method for extracting closed geometric models from volume data," Computer Graphics 25, 4:217–226 (1991)).

While GDMs share many similarities with the "snake" models discussed above, they differ fundamentally in how they define the contour and, accordingly, how the deformation occurs. The "snake" models are basically a series of connected spline segments. During deformation, optimization is performed along the entire spline and all points are adjusted. In GDMs, the contour is defined as a series of vertices (FIG. 1) which are in turn connected by edges. This is in essence a discrete model, with the resolution determined by the length of the edges between vertices. The more simplified discrete structure of GDMs allows the internal and external forces to be calculated independently at each vertex using local information. The deformations are applied at the vertices only, with the goal of minimizing the forces acting upon each vertex.

The GDM's force function, in particular the internal force component, also differs from that of the snake model. For the GDM, the curvature at a vertex is approximated by the magnitude of the vector difference between the edges joining at that vertex. The simplicity of the underlying structure of GDMs allows for an easier and much faster convergence to a final contour than prior art "snake" models. This simplicity also translates to a reduction in the number of user-specified parameters to just three: the internal and external force weightings, and the between-vertex spacings.

According to the method of the present invention, aspects of both the local and regional detectors found in the simpler and more efficient GDM technique have been adopted. In order to address the large source of variability in the segmentation arising in the prior art from the requirement for a user-defined initial contour, the method of the present invention uses an automated contour initialization and requires the specification of only a single seed point in the approximate center of the vessel lumen in any slice of the vessel. This automated initial contour selection is particularly well suited to the subsequent GDM application step which is sensitive to the placement of this initial contour (i.e. the external forces, which pull the contour to the true boundaries, are local in nature and can exert their forces only within a limited region).

In the following description, the various stages of the inventive segmentation algorithm are presented, including initialization and deformation, followed by a discussion of experimental results.

1. Initialization

For the case of transverse images of the carotid arteries or any other fluid-filled structures, the contours will be closed or nearly closed. As such, a two-step method is provided according to this invention for automatic initial contour generation.

a. Edge Selection

Figure 2:
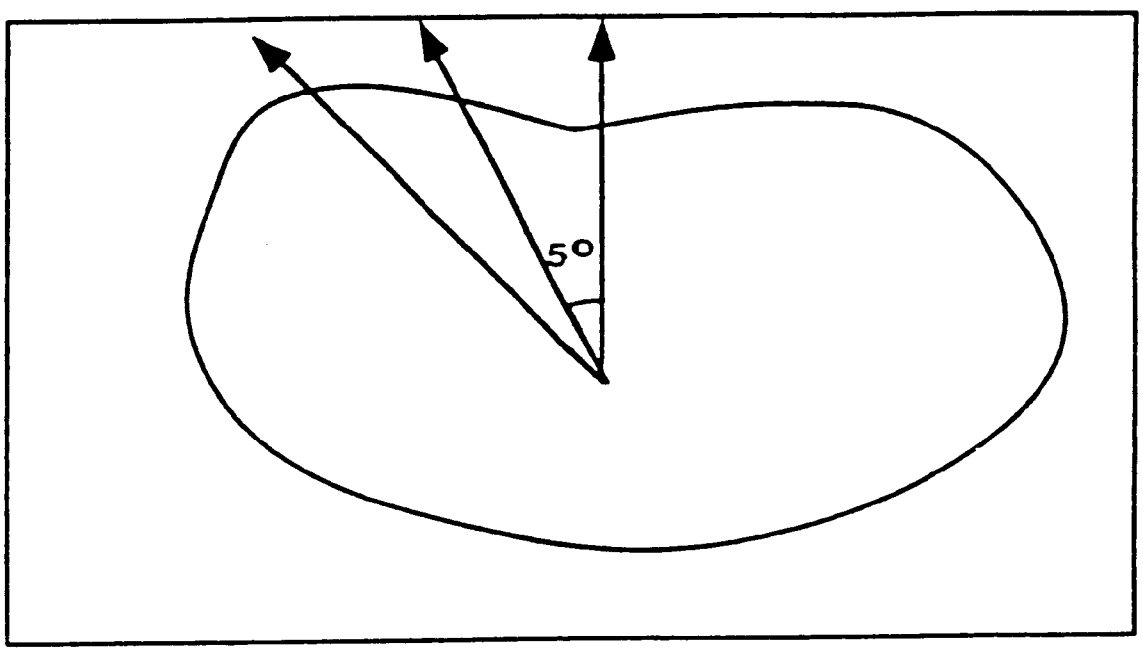
FIG. 2 is a schematic representation of a hypothetical vessel boundary, with search rays extending radially from a single seed point for the purpose of edge selection during an automated initial contour identification step according to the method of the present invention.

A collection of straight line rays 5° apart are extended radially outward from the seed as shown in FIG. 2. A preprocessing operation is performed along the ray using a 3×3×3 kernel Specifically, at each voxel along the ray, I(i,j,k), a local median, mean, and variance operation is performed on the 3×3×3 kernel, generating the values md(i,j,k), mn(i,j,k), and v(i,j,k), respectively. If the variance between the voxel's intensity and the local mean is 50% greater than the average local variance, it is replaced by the median value of the kernel according to the following two equations:

$$I'(i, j, k) = \frac{\sqrt{I^2(i, j, k) - mn^2(i, j, k)} - \text{var}(i, j, k)}{\text{var}(i, j, k)}$$

if I'(i,j,k)>0.5 then I(i,j,k)=md(i,j,k)

The intensity profile of the resultant ray is then searched for the boundary of the vessel using threshold analysis. The profile is evaluated at multiple thresholds, resulting in a multilevel binary "threshold tree" as shown schematically in FIG. 3 for the typical profile of an edge. A "0" indicates a voxel intensity below the threshold value and a "1" above.

To avoid variability due to user-defined parameters, thresholds are automatically selected for each ray, making them adaptive to the image properties. A simple search is conducted for the maximum intensity along the ray, with the condition it any maximum conforms to a trend and is not an isolated noise occurrence, for calculating the five thresholds of the tree in FIG. 3. In calculating these five thresholds, it is assumed that the voxel with maximum intensity, $I_m$ is likely a part of the boundary edge along this ray, and therefore the thresholds are chosen so as to have this voxel occupy at least four levels of the threshold tree. Using the intensity $I_o$ at the origin of the ray, along with the previously found $I_m$, the thresholds $T_i$ are specified as follows:

$$\Delta I = (I_m - I_o)/4$$

$$T_i = I_o + (i * \Delta I); \quad i=1,2,3,4,5$$

The information in the "threshold tree" is used to create a list of potential candidates for the vessel wall boundary. If an analysis of the resulting candidate edge points reveals that there are too many candidates, then $\Delta I$ is increased using $\Delta I = (I_m - I_o)/3$, and the threshold tree is reevaluated.

From the information in the tree, three descriptors of a candidate edge are determined. These are: start position, length, and number of levels occupied. For the tree in FIG. 3, the result is as shown in Table I.

TABLE I

Figure 3:
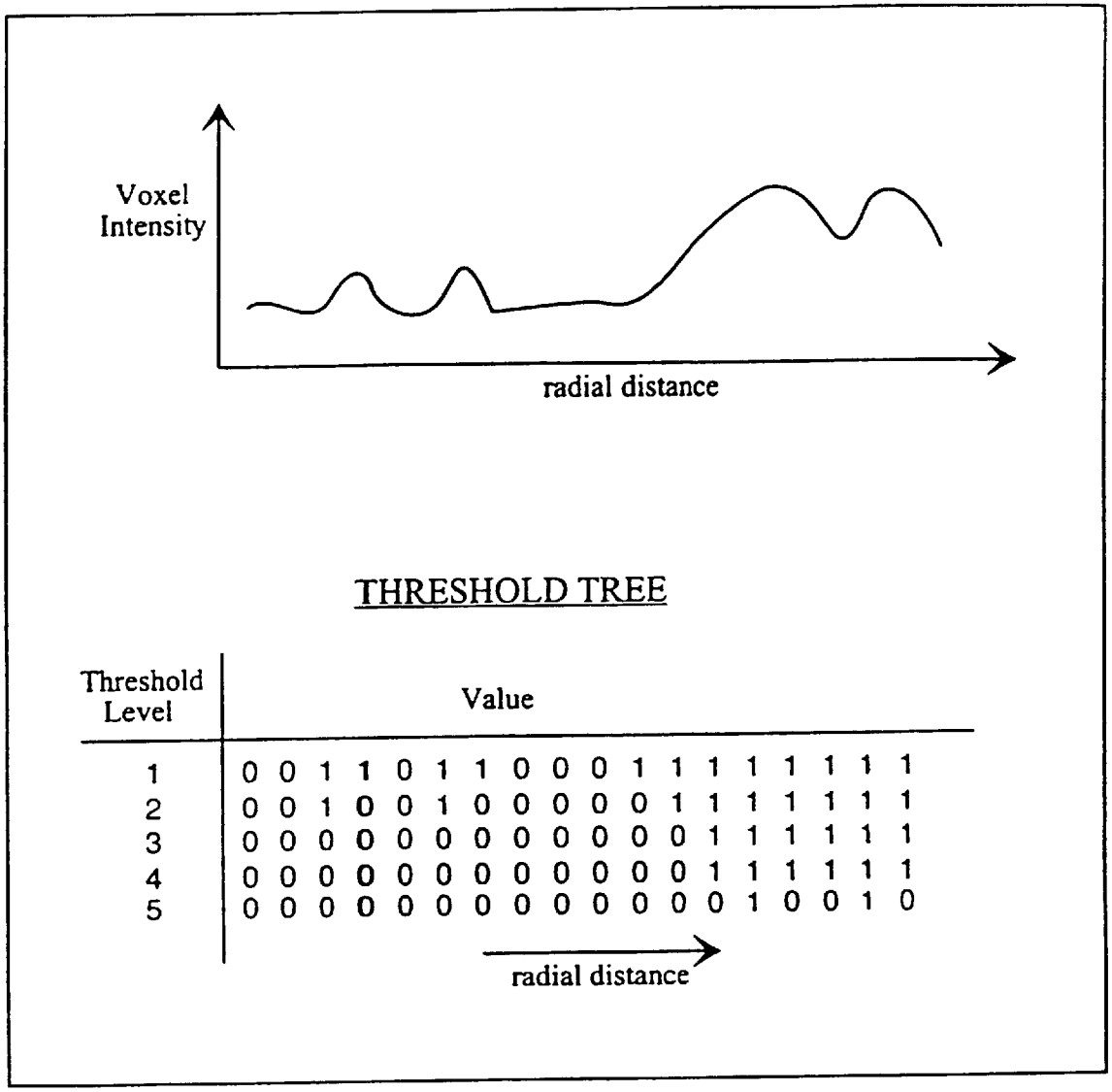
FIG. 3 is a graph showing an intensity profile and the corresponding Threshold Tree with five threshold levels for the hypothetical vessel boundary of FIG. 2.

Results of profile analysis for edge in FIG. 3

| Candidate | Position | Number of Levels | Edge Length |
|---|---|---|---|
| 1 | 4 | 1 | 1 |
| 2 | 6 | 2 | 1 |
| 3 | 9 | 5 | 7+ |

Using these descriptors, a set of four criteria are derived for rating the candidates. These are: edge position relative to that of possible candidates from other adjacent rays within the slice, the edge strength (or the number of levels occupied), the edge length, and the variance in the voxels along the ray between the origin and the candidate edge. Using these criteria, an initial boundary point is selected as described, and the points are then further refined as described below under the discussion of Contour Formation.

More particularly, within a set of candidates in a ray, each criterion is normalized across all candidates to give a value between 0 and 1. This ensures that at least one candidate receives the maximum value in each of the criteria.

$$E_j^i = \frac{E_j^i}{\max(E_{j=1\,\text{to}\,n}^i)}$$

where i=1 to 4, representing the four criteria indicated above.

For an edge, the sum total would be given by:

$$S_j = \sum_{j=1}^{4} w_i E_j^i$$

where $w_i$ is the relative weighting of criterion i. Initially, w=1 for all criteria. If the point total for one of the edges, $S_j$, is significantly greater than any of the others, it is automatically selected as the initial boundary point:

if $S_j > 1 + (\max S_k), k=1$ to n, k≠j then j=initial edge

If no dominant edge is present, the relative weightings of the criteria are readjusted. Difficulty in selecting an edge occurs most often in areas of strong shadowing and noise artifacts. In these areas it is more useful to place the greatest emphasis on proximity (criterion 1), followed by length (2), strength (3), and variance (4). Therefore, initial weight adjustments are chosen to reflect this priority, and are set as follows:

$w_1 = 1.0$ $w_i = w_{i-1} - 0.1, i=2$ to 4

Subsequent weight adjustments are set as $w_i = w_i - 0.1$, i=2 to 4, with the proximity criterion, $w_i$ remaining at 1.0, throughout. In this way, an attempt is made to include as many of the edge criteria as possible in selecting the boundary, while slowly shifting the main emphasis towards the proximity criterion and the continuity of the contour.

b. Contour Formation

The proximity, or continuity, criterion constrains adjacent rays to select boundary points that are continuous within a slice. To extend this continuity constraint to three dimensions, a second pass is made through the data and the boundary placement is finalized. Each previously selected boundary location is compared with that of the candidates in the two adjacent rays in the current plane and the three in each of the adjacent planes, giving eight neighboring boundary points. The selected point is then compared to its eight neighbors, and if it is outside the volume defined by them., then other candidates are examined. Otherwise, the point is considered to be the best boundary location and is saved as a point along the forming contour.

At the end of this process, a set of automatically generated contours is provided consisting of discrete points connected by edges as shown in FIG. 1. This is precisely the configuration needed by the GDMs.

2. Deformation

According to the segmentation method of the present invention, the well known deformation technique described by Lobregt et al., has been adopted (see S. Lobregt and M. A. Viergever, "A discrete dynamic contour model," IEEE Transactions on Medical Imaging 14, 12–24 (March 1995)). The vertices illustrated in FIG. 1 represent the $i^{th}$ vertex with Cartesian coordinates ($v_{ix}$, $v_{iy}$). The vectors $d_i$ connect adjacent vertices, and are labeled in a counter-clockwise direction. The length of the vectors $d_i$, ($\|d_i\|$), connecting the vertices determines the local contour resolution. If the vector lengths are allowed to be too large, small changes in the image cannot be followed, but if they are too small, the contour may track small noise variations. The length of $d_i$ can change at each iteration during deformation, but is kept within bounds of ±⅓ of a user-specified resolution, r, by removing or inserting vertices as needed. If $\|d_i\|$ exceeds the maximum allowed resolution, a new vertex is inserted midway between the two vertices, and if $\|d_i\|$ is less than the minimum allowed resolution, then one is removed and the other is adjusted to lie midway between its original position and that of the removed vertex.

a. Internal Force

Figure 4:
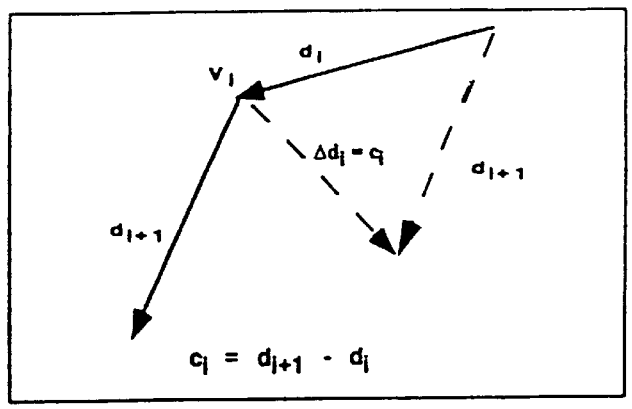
FIG. 4 is a schematic GDM curvature representation (a) at a vertex defined as the subtraction of two adjacent vectors, and (b) at three angles, for minimizing contour energy following the initial contour identification step according to the present invention.
Figure 4:
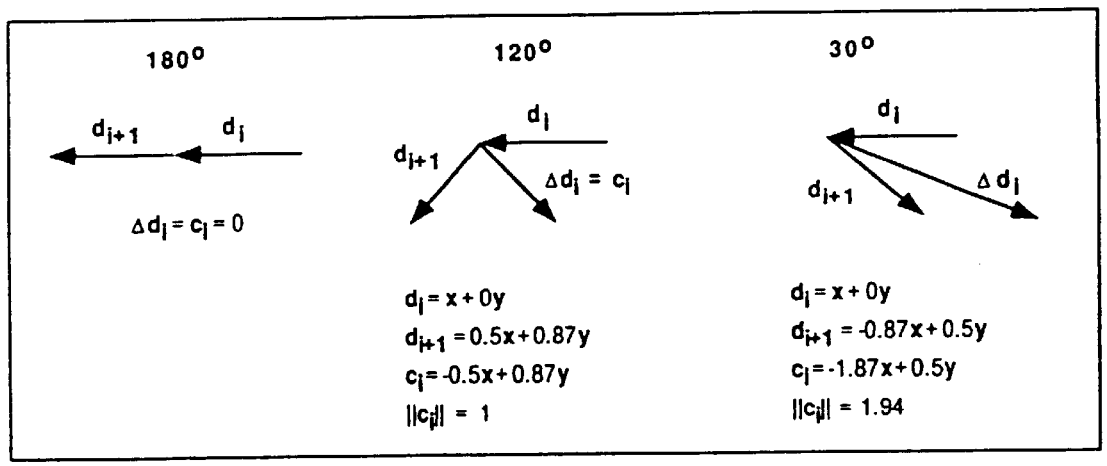

With a vector model, the internal force can be represented by the curvature of the vertices. The curvature can be described very simply as the vector difference between the two edges sharing that vertex. Using the normalized vectors $d_i$ and $d_{i+1}$, FIG. 4(a) illustrates how vector subtraction gives a curvature vector $c_i$, that provides a measure of the angle between the two edges. As illustrated in FIG. 4(b), the sharper the local curvature, the longer this vector will be. It should be noted that the magnitude of the curvature vector, $\|c_i\|$, varies between zero and two. In order to minimize the internal contour force, the vertex $v_i$ must be moved in the direction of the curvature vector, making $F_{int} = c_i$.

In minimizing the curvature of the contour as a whole, areas of constant or slowly varying curvature should not be affected. To do otherwise would cause circular and polygonal shapes to continue to pull the vertices inward until they converge into a single point. This problem is avoided by applying a symmetrical filter centered at each vertex, and making the internal force a function of the filtered curvature vectors, as set forth in the Lobregt et al paper. According to the preferred embodiment, the following filter parameters were used:

$\{\ldots a_{i-2}, a_{i-1}, a_i, a_{i+1}, a_{i+2} \ldots\} = \{\ldots 0 -\frac{1}{2} 1 -\frac{1}{2} 0 \ldots\}$ Therefore, the internal force at vertex i would be $$F_{int_i} = \left(-\frac{1}{2}\|c_{i-1}\| + \|c_i\| - \frac{1}{2}\|c_{i+1}\|\right)\frac{c_i}{\|c_i\|}$$

b. External Force

To find the external force at each vertex, the gradient $g_i$ is first calculated using the Sobel operator and the result is then transformed according to an exponentially decaying function to give a scaled gradient $G_i$.

$G_i = 2e^{-g_i/15}$

This equation was chosen based on observations over a wide range of images, where it was noted a gradient magnitude less than 15 rarely occurred in regions on the border or outside of the structure of interest. A factor of two was used to give the scaled gradient a magnitude range of zero to two, as with the curvature vector.

Figure 5:
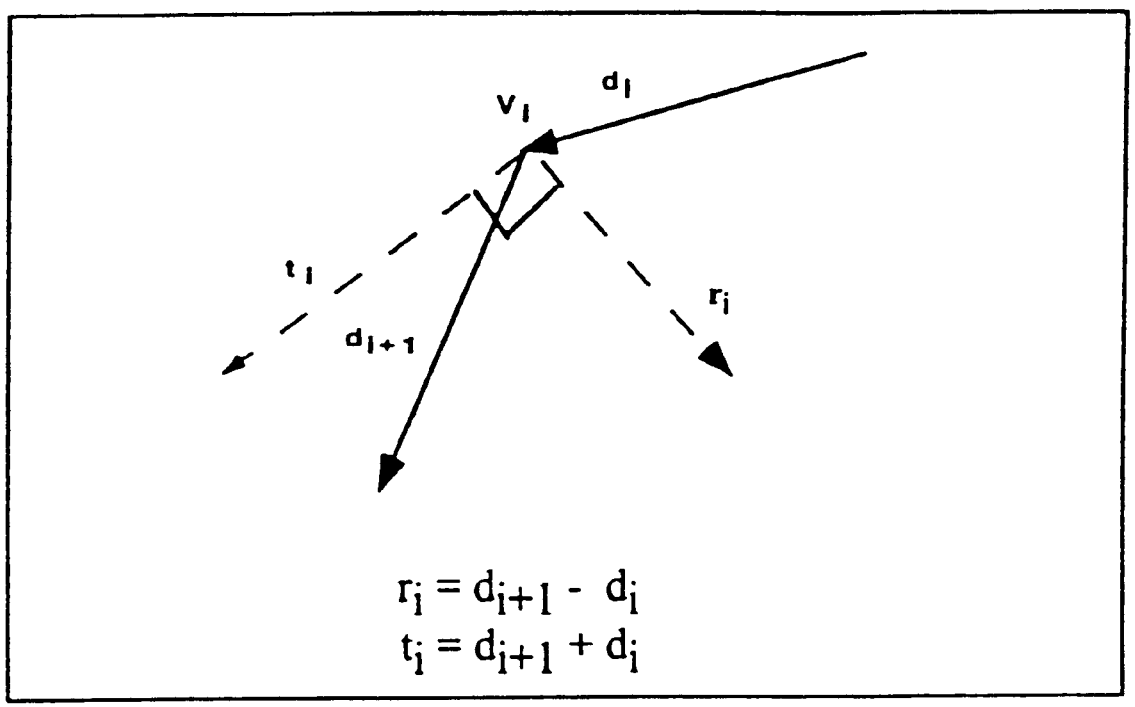
FIG. 5 is a schematic representation showing the tangent and radial vectors at a vertex, for calculating external force used in the GDM.

The vector $G_i$ at a vertex $v_i$ can be separated into two perpendicular component vectors, one tangential to the contour and the other in the radial direction. It should be noted that moving the vertex along the contour (i.e., in the tangential direction) does not change the contour shape. Therefore, only a force in the radial direction is required to be defined in order to move the vertex radially. In FIG. 5, it will be noted that the tangent vector at vertex $v_i$ is represented by the sum of the normalized distance vectors $t_i = d_i + d_{i+1}$. If the tangent is rotated by $-\pi/2$, it will point in the local radial direction:

$$r_i = \begin{bmatrix} 0 & -1 \\ 1 & 0 \end{bmatrix} t_1 = -d_i + d_{i+1} = c_i$$

Therefore, the curvature and the local radial direction vectors are equivalent, causing the internal and external forces to act along the same radial line, either in the same or in opposite directions. To calculate the external force, the transformed gradient is normalized along the radial direction, thus:

$$F_{ext} = \frac{(G_i \cdot r_i)}{\|r_i\|^2} r_i.$$

C. Total Force and Deformation

The total force acting upon a vertex is a weighted sum of the internal and external forces, thus:

$$F_{total} = w_{ex} F_{ex} w_{in} F_{in}$$

where the two parameters $w_{ex}$ and $w_{in}$ determine the relative weightings. If the force at a vertex is sufficiently small such that it experiences no translations for three consecutive iterations, that vertex is deemed "stable" and is locked into its position. According to the best mode as of the time of filing this application, the deformation process is stopped when at least 90% of the vertices have been locked into place, or a maximum 100 iterations of the algorithm have been carried out. This constraint is imposed in order to ensure a controlled exit for a case where the initialization step has produced a poor contour, with little chance of the vertices settling at a stable boundary.

3. Experimental Results

The 3-D images used in testing the algorithm of the present invention were all obtained using a Sirus 3-D Ultrasound imaging system (Life Imaging Systems, Inc., London, Canada) with a linear scanning mechanism, as is set forth in commonly assigned issued U.S. Pat. Nos. 5,562,095 and 5,454,371, the contents of which are incorporated herein by reference. This mechanism consists of a mounting device to hold a transducer in place, and a motor system to translate the transducer across the surface in a linear manner. The ultrasound machine used in the experiments was an ATL Ultramark-9 (Advanced Technology Laboratories, Bothell, Washington) with an L 10 5 38 mm linear transducer array. The mounting device was manually adjusted to be perpendicular to the scanning direction, thus making the ultrasound beam transverse and perpendicular to the vessel. The scanning speed was set at 3.75 mm/sec and the acquisition rate was set at 15 frames/sec, giving a between-frame separation of 0.25 mm. A total of 200 2-D images covering a length of 50 mm were acquired in about 13 seconds. The 2-D images were reconstructed to form a 3-D volume which was viewed and manipulated using the Sirus 3-D viewing software set forth in the above-identified patents.

To verify the accuracy of the 3-D imaging system, a string test phantom of known dimensions was imaged. The phantom is described in greater detail with reference to U.S. Pat. No. 5,341,808, and was built from an acrylic frame with four horizontal planes 10 mm apart. Surgical silk was stretched across each plane at spacings of 10 mm, to produce a 10 mm 3-D grid system. The phantom was submerged in a 7% glycerol solution (which mimics the speed of sound in tissue) and scanned. Manual measurements obtained from the 3-D reconstructed image were compared with the known distances, and the results were found to be within ±0.1 mm (or 1%) for both the in-plane and between-plane readings.

The algorithm was tested on wall-less carotid phantoms with varying degrees of stenoses in the internal carotid artery. These phantoms consisted of a "common" channel bifurcating into two additional channels, the "internal" and "external" carotid arteries, all of which were wall-less within a block of agar. The phantoms had stenoses of 30%, 60%, and 70% as defined by NASCET (see above), and their channels were filled with a 7% glycerol solution prior to scanning. The phantoms were submerged in the glycerol solution so that about 2 mm of the solution covered the surface, providing good acoustic coupling to the transducer. The axis of each phantom was manually adjusted to be approximately parallel to the scan direction. Each phantom was scanned using B-mode imaging at a depth setting of 2.8 cm and a single focal zone at 2.0 cm.

After 3-D reconstruction of each set of acquired data, the vessel lumen was segmented. As discussed above, in the segmentation algorithm of the present invention, there are three user-specified parameters: the two force weightings $w_{ex}$ and $w_{in}$, and the desired model resolution r. The internal and external weightings were set at $w_{ex}=0.3$ and $w_{in}=1.0$ in order to place greater emphasis on the internal contour smoothing, assuming the initialization process had performed well at localizing the edge boundaries. If greater weighting were to be given to the external gradient features, the contour could be attracted to high gradient noise in the image. The contour resolution was set at r=15, giving an allowable range of distance between vertices of between 10 and 20 pixels. For the images analyzed, this corresponded to a range of 0.8 to 1.7 mm.

Figure 6A:
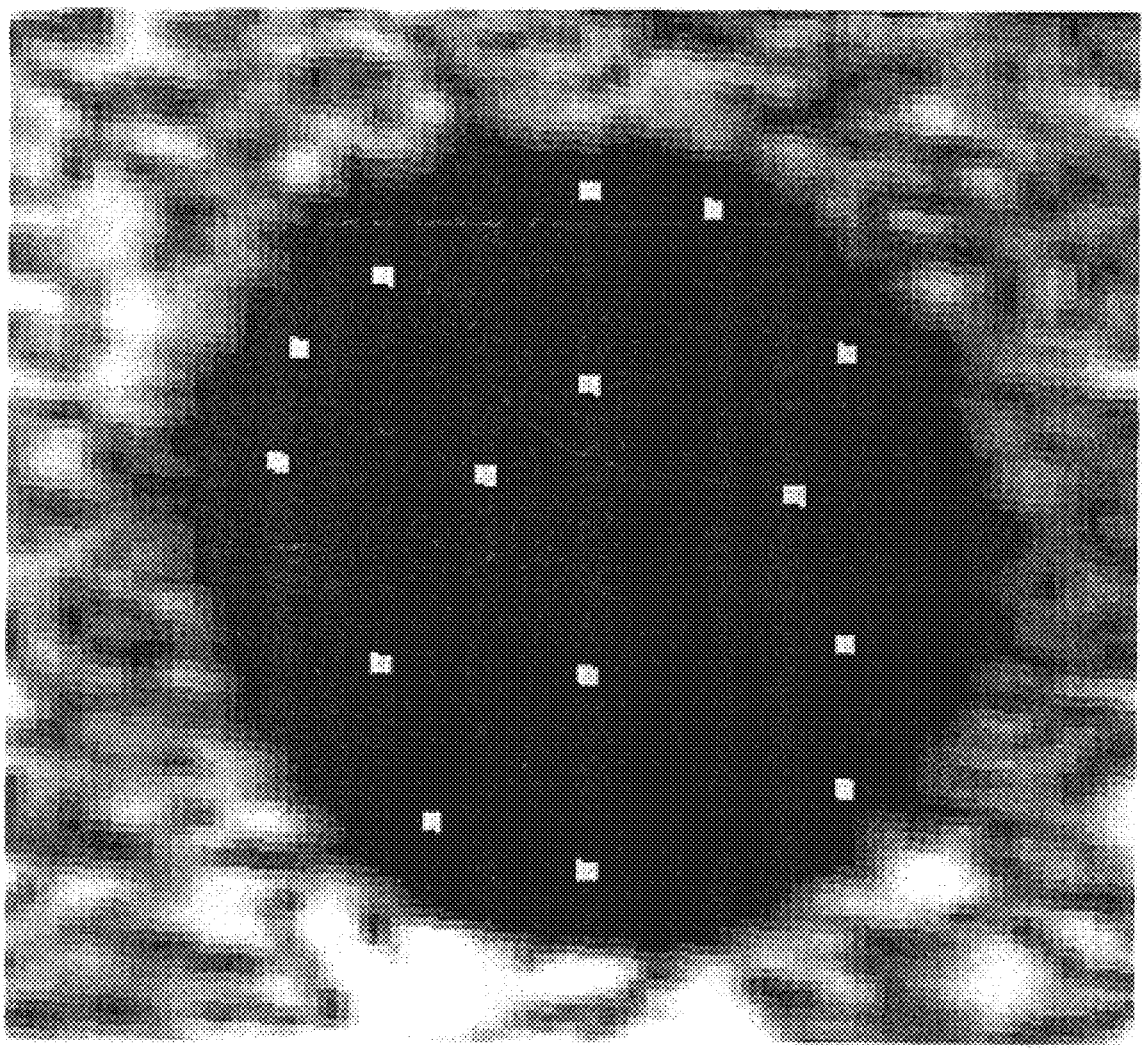
FIG. 6(a) is an image of a single vessel slice showing the placement of 15 seed points.
Figure 6:
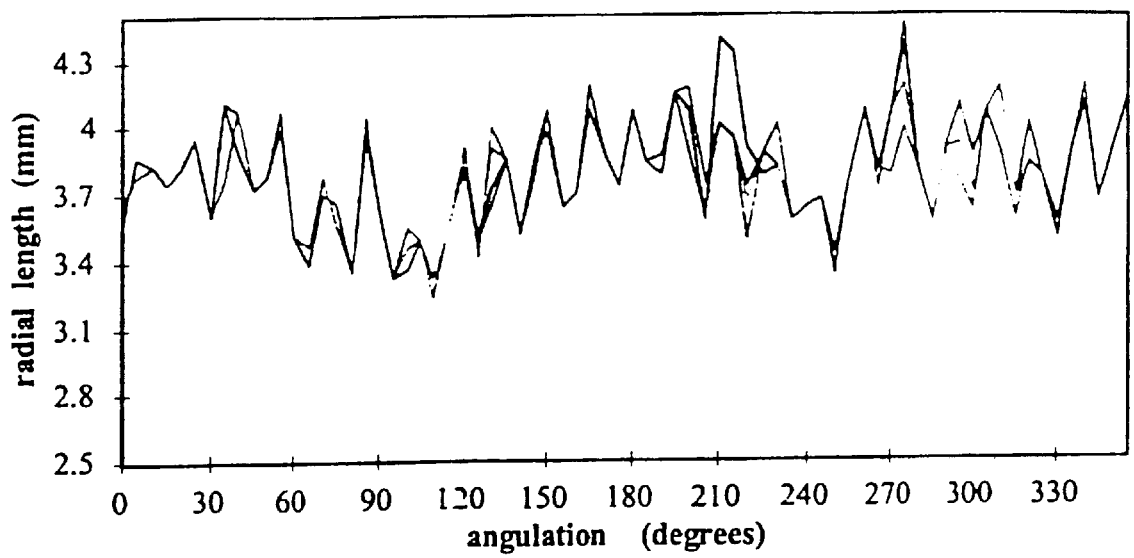
Figure 6:
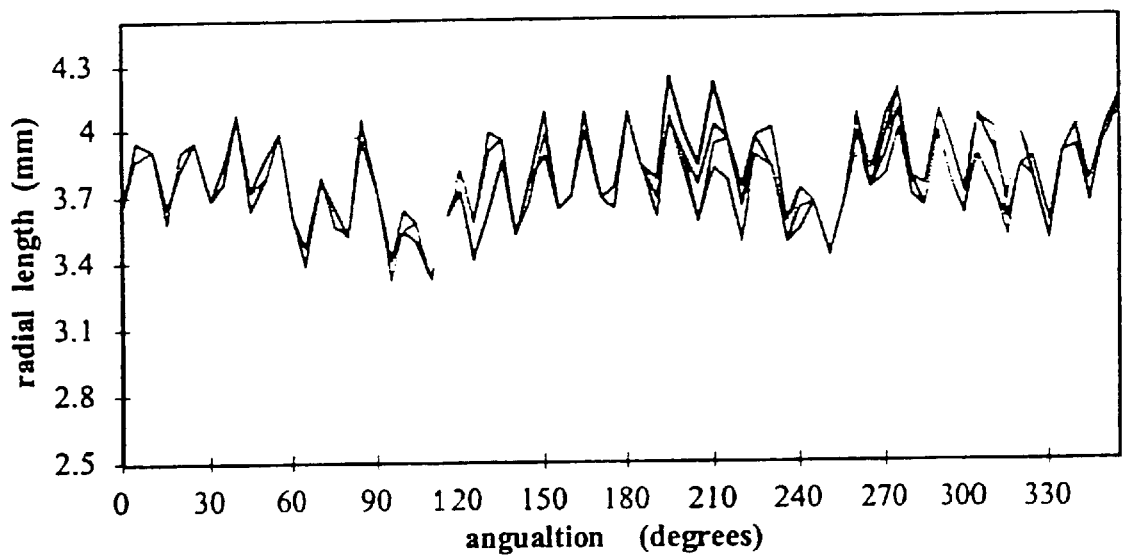

A single seed point in the center of any slice of the vessel is required to initiate the segmentation. To investigate the variability in the resulting contour due to the placement of this seed, a slice was selected from the common carotid region and seeded using 15 different positions, ranging from the center to near the vessel boundary, as shown in FIG. 6(a). For each selected seed point, the initial contour was found and analyzed by determining the radial length from the approximate center of the lumen to the initial contour at 5 intervals. The results are plotted in FIG. 6(b). Following each seed point selection, the segmentation proceeded as set forth above, resulting in the final contour. These contours were then analyzed as above for the initial contours, and the results are plotted in FIG. 6(c). In addition, the areas contained within the initial and final contours were determined, and their mean and standard deviation calculated.

Figure 7:
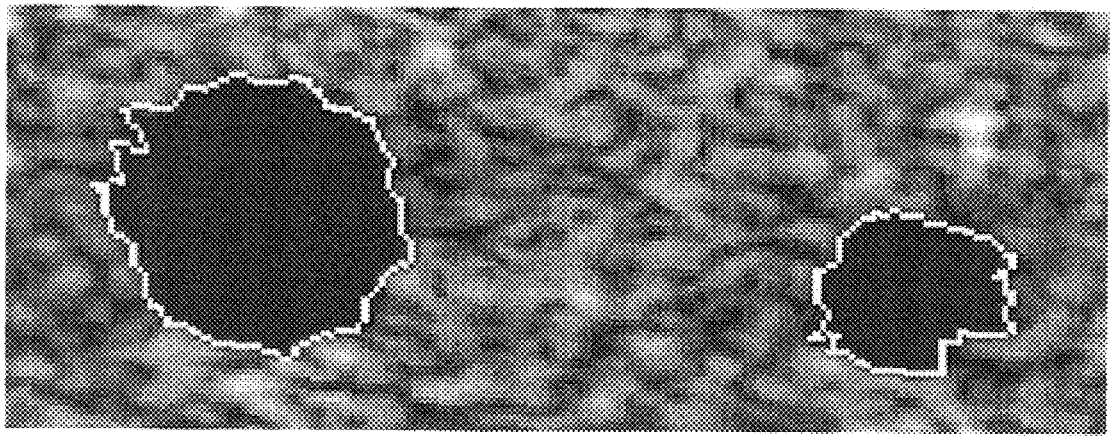
Figure 7:
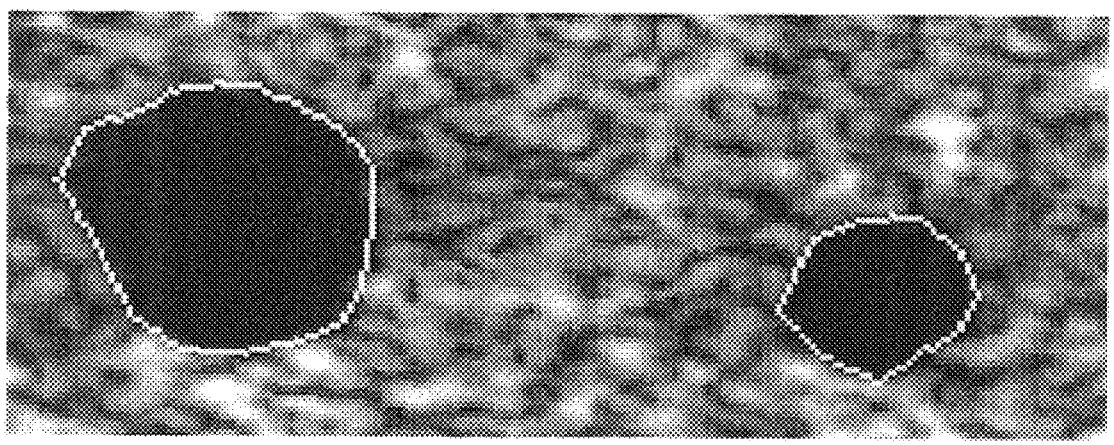
Figure 8A:
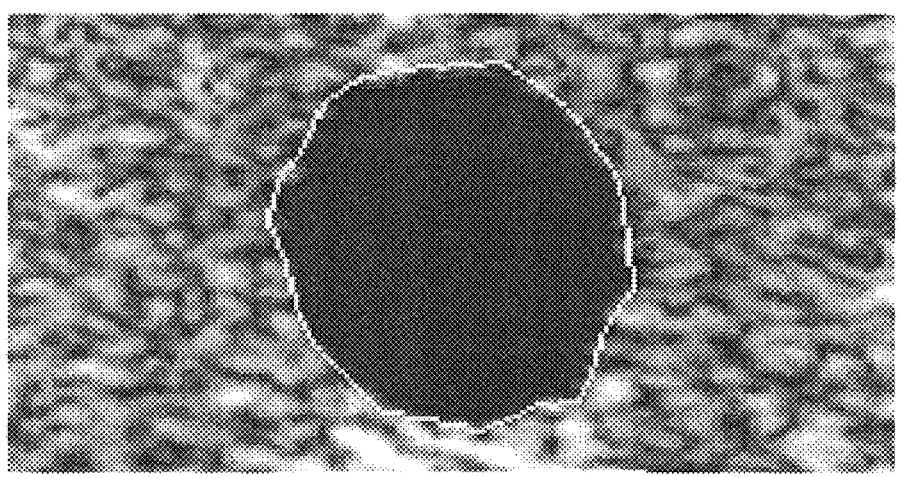
FIG. 8 shows the segmentation results according to the method of the present invention for a 60% stenosis phantom at the common carotid (FIG. 8(a)), at the bifurcation (FIG. 8(b)), and above the bifurcation at the internal and external carotids (FIG. 8(c)).
Figure 8B:
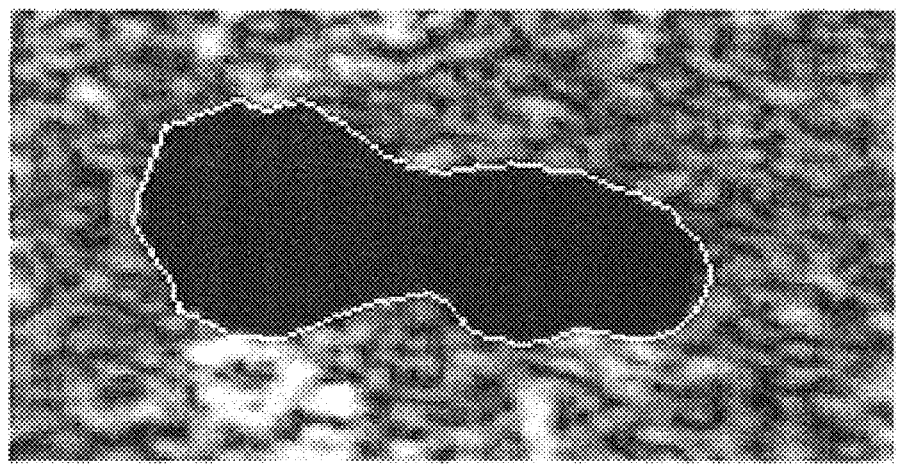
Figure 8C:
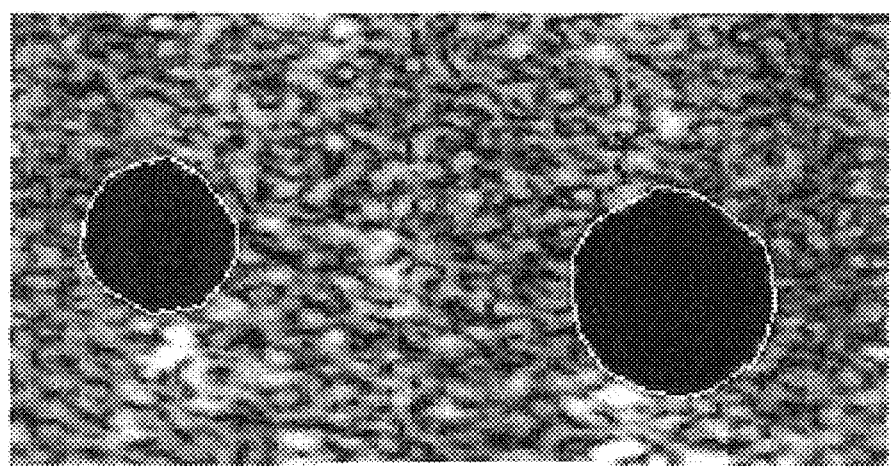
Figure 9:
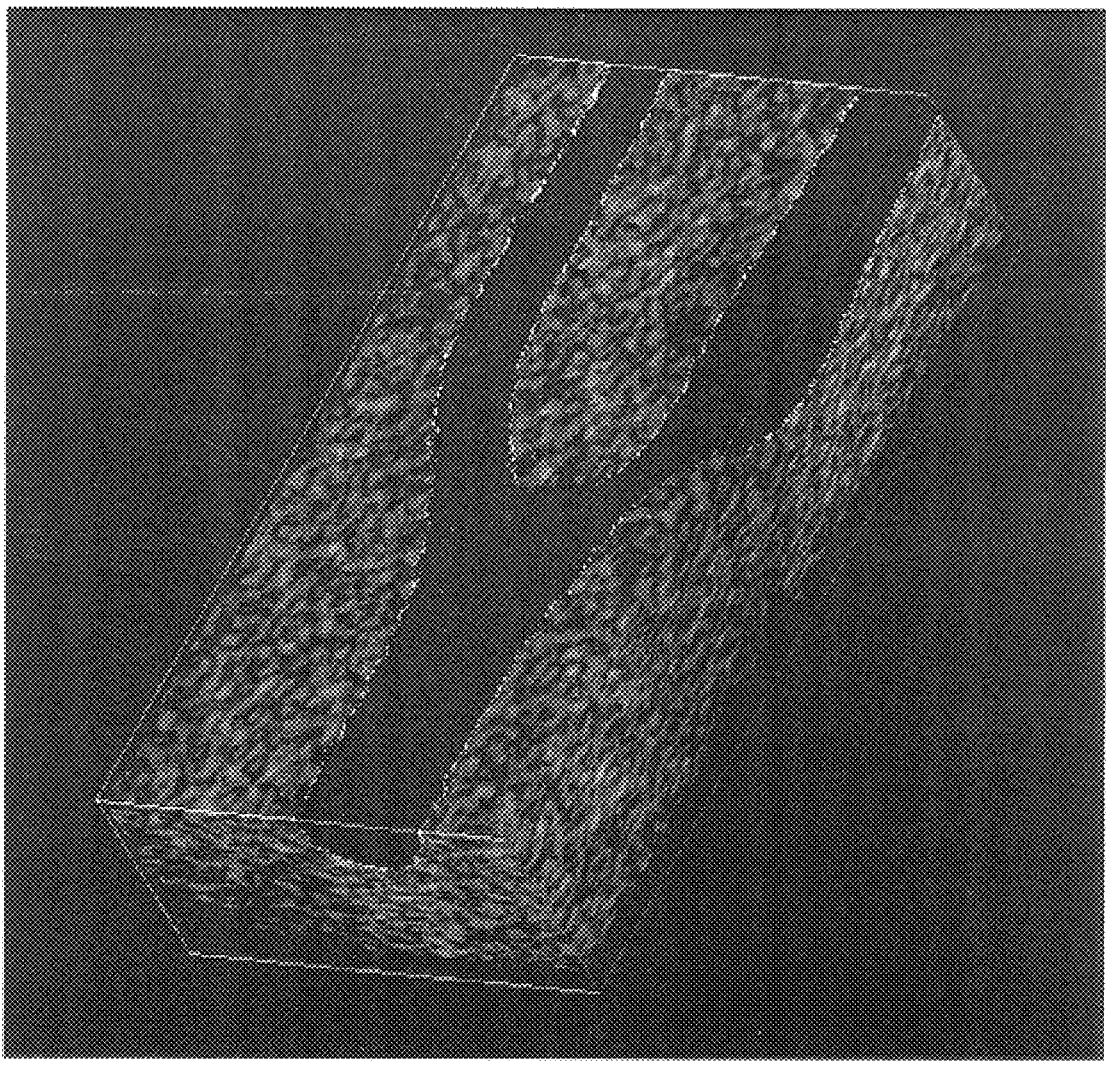
FIG. 9 is a multi-planar reformatted 3-D image of the 60% stenosed phantom of FIGS. 7 and 8 showing three cut planes.
Figure 10:
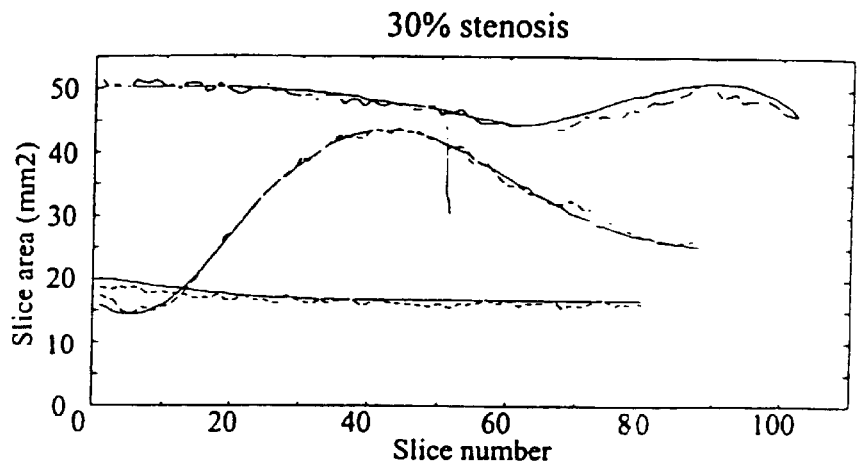
FIG. 10 shows lumen cross-sectional area as a function of distance along each branch for both the numerical models used in casting the phantoms used in the examples of FIGS. 7–9 and the segmented results for (a) 30% stenosis; (b) 60%; and (c) 70%.
Figure 10:
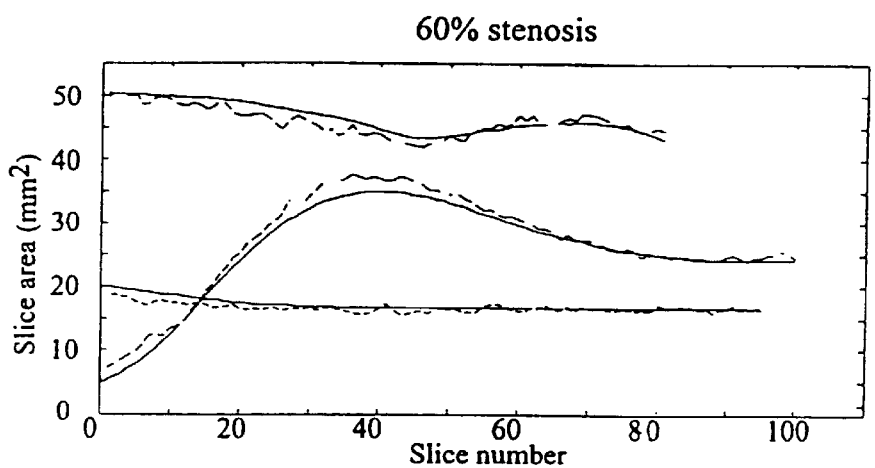
Figure 10:
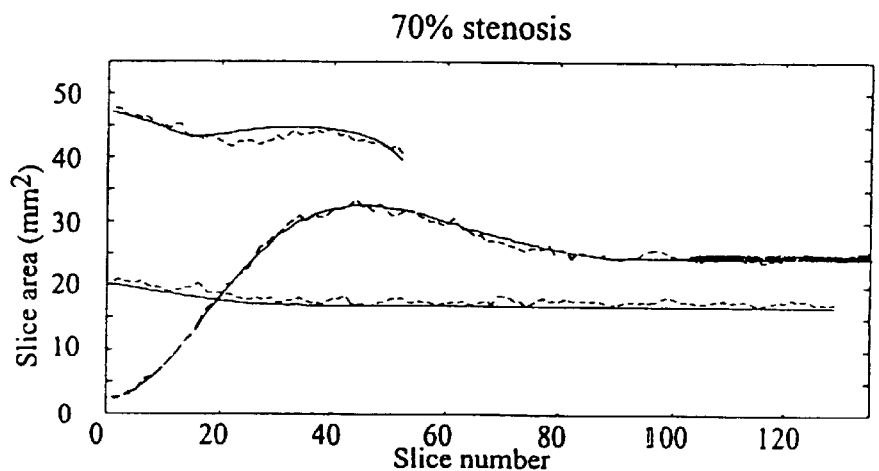

For each stenosed vessel, a single seed point was chosen at the approximate center of each branch. The segmentation procedure produced a contour every 0.25 mm. The effects of the GDM application on a contour's energy is shown in FIG. 7, while samples of the final segmentation are shown in FIGS. 8 and 9. The area within each contour was then calculated by summing the number of pixels within the contour and multiplying by the area of a pixel. These values were compared with the known areas from the numerical model used in casting the phantoms, and the results are shown in FIG. 10 and Table II.

TABLE II

Average magnitude difference between numerical and calculated areas. The stenosis severity is as defined by NASCET.

| Stenosis severity | 30% | 60% | 70% |
|---|---|---|---|
| Common | 1.7% | 2.2% | 2.0% |
| Internal | 1.6% | 2.2% | 2.0% |
| External | 1.4% | 4.5% | 4.6% |
| Total Average | 1.6% | 3.0% | 2.8% |

Figure 11:
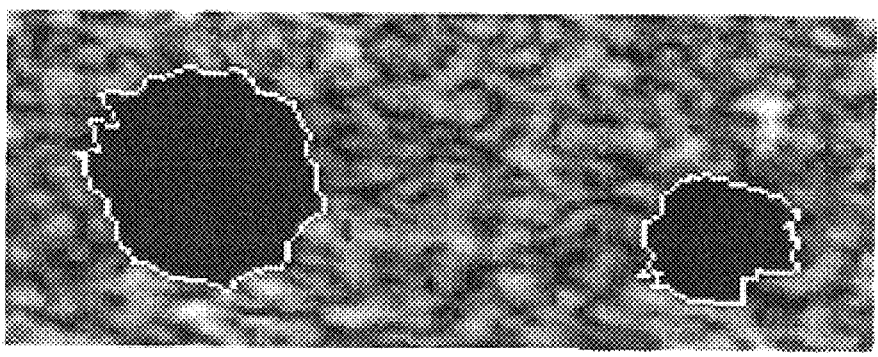

Because the curvature at a vertex in a GDM model is defined as the vector difference between the two edges joining a vertex, little or no curvature will be detected if the vertices are too closely spaced. Therefore, GDMs are limited in the resolution that they can provide. Accordingly, the effects on the final contour of varying the contour's resolution was investigated using vertex spacings of r=8, 15, and 25 pixels. After convergence to a final contour, a plane above the bifurcation was selected and the results are shown in FIG. 11. The areas within each contour were also calculated.

In addition to measurement of accuracy, the time required to determine the initial contours for each vessel and the added time required to determine the final contour after application of the GDM, were measured. The timing was performed on 9500 Power Macintosh prototype running at 100 MHz.

Finally, in order to determine the algorithm's ability to segment images of human carotids, images from two patients were analyzed. The images were acquired using two different acquisition techniques. One was scanned using the linear system described above in the phantom experiments, and the other was scanned using a free-hand magnetic position and orientation measuring (POM) 3-D system (Flock of Birds, Ascension Technologies). The results of the segmentation are shown in FIG. 12.

The variability in segmentation caused by the seed point selection was evaluated using plots of the radial distance from the center of the structure to the contour, at five spacings. FIG. 6(b) shows the radial contours resulting from the initialization steps. It can be seen that there are only small variations in the fifteen contours generated by the different seed points, even with respect to the extreme placements near the contour boundary. FIG. 6(c) shows that the radial contours are smoother and more clustered after application of the GDM. The mean area of the contours was 47.7 mm$^2$ after initialization and 47.1 mm$^2$ after GDM application, showing that the area did not change significantly. However, the standard deviation of the 15 area estimates was reduced from 0.18 mm$^2$ to 0.09 mm$^2$, showing that the application of the GDM resulted in the contours converging to a nearly common final result.

Figure 7A:
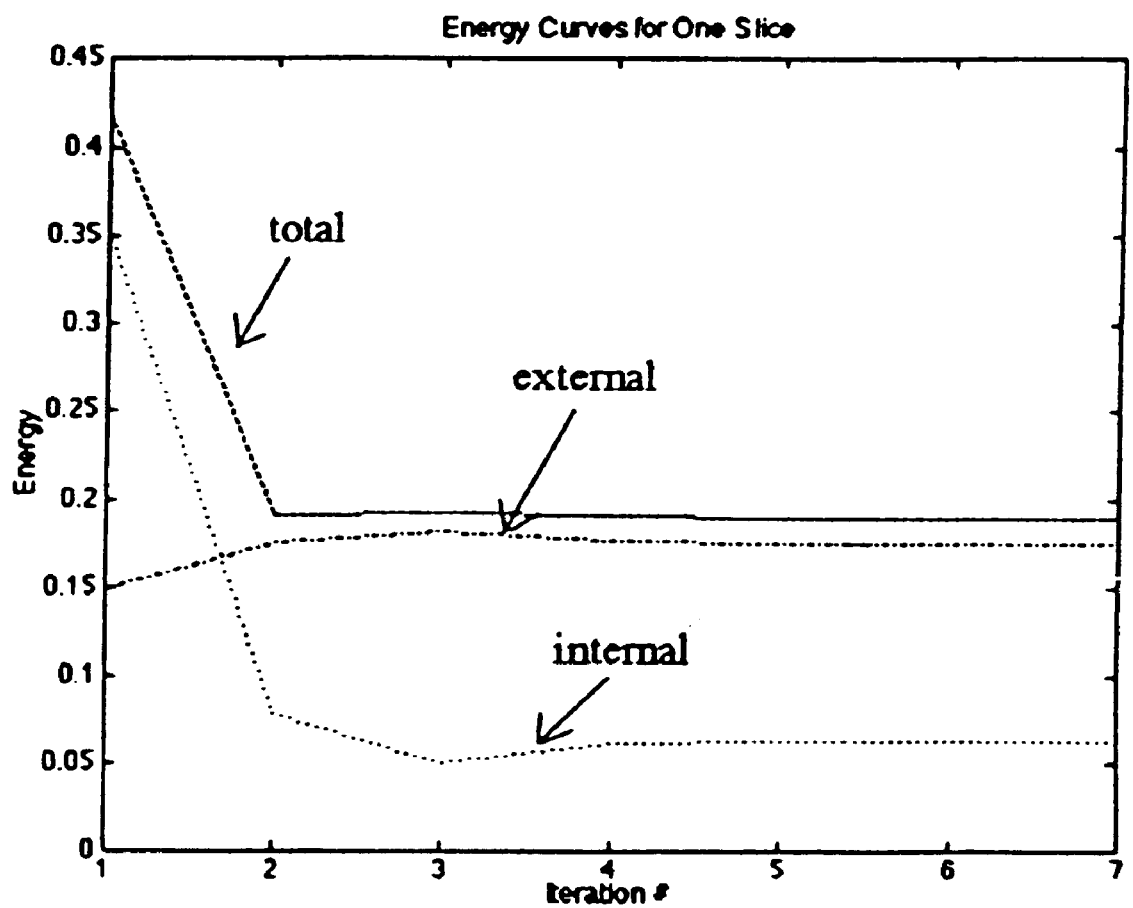
FIG. 7(a) is a graph showing the total energy, and the internal and external components as a function of iteration number.

FIG. 7(c) shows a plot of the internal, external, and total force versus iteration number for a slice through the 60% stenosed phantom at a location above the bifurcation. It can be seen that only five iterations are required for the deformation process to settle, likely due to the closeness of the initial contour. Also, it should be noted that the external force has increased slightly in the process of reducing the internal curvature of the contour. The corresponding initial and final contours are shown in FIGS. 7a and 7b, respectively. From these figures, it will be noted that the initial contour is a very close fit to the speckle at the lumen boundary, and that the GDM deformation serves mostly to smooth the contour. FIG. 8 shows the final segmentation for the 60% stenosed phantom in regions at the common carotid (FIG. 8(a)), the bifurcation (FIG. 8(b)), and above the bifurcation at the internal and external carotids (FIG. 8(c)), while FIG. 9 shows a cross-section through the length of the phantom. These figures provide a visual, qualitative assessment of the segmentation algorithm of the present invention, showing that the segmentation performs very well on the stenosed phantoms.

Because the numerical model values for the cross-sectional areas were determined perpendicular to the vessel axis (of the "common carotid"), an exact comparison with the scanned data would require alignment of the phantom with its axis parallel to the scanning axis. Although this was attempted visually, a small angular uncertainty remained. To minimize the effects of the angular uncertainty, separate comparisons were performed for each branch of the three vessels. To match the scanned location with the numerical model, the measured cross-sectional areas were shifted and the chi-squared difference minimized. The results are plotted in FIG. 10. From these figures, it is apparent that the cross-sectional areas match well with the numerical model. Quantitative comparisons between the measured and numerical areas are shown in Table II (above) for the branches of the three vessels. From this Table, it can be seen that the mean difference between the numerical and measured areas was 3% or less.

Figure 11B:
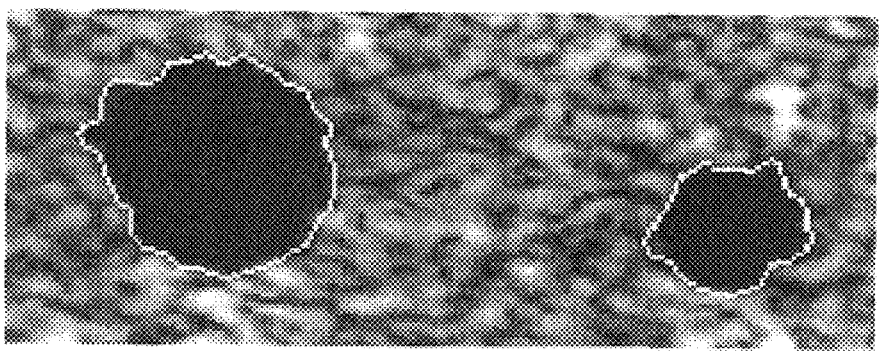
FIG. 11(b) shows the final contour for a vertex spacing of r=8 pixels.
Figure 11C:
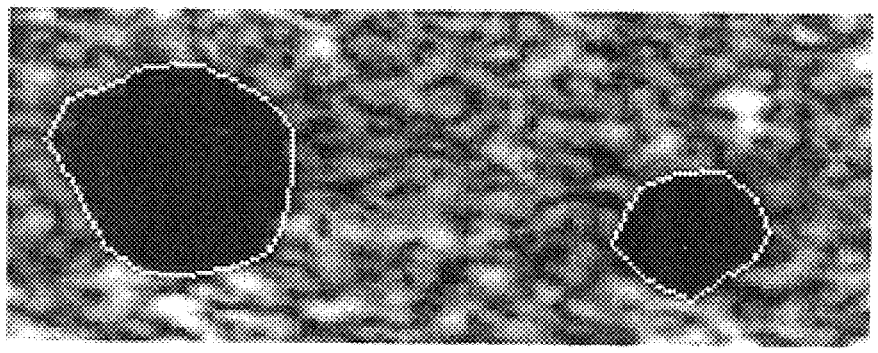
FIG. 11(c) shows the final contour for a vertex spacing of r=15 pixels.
Figure 11D:
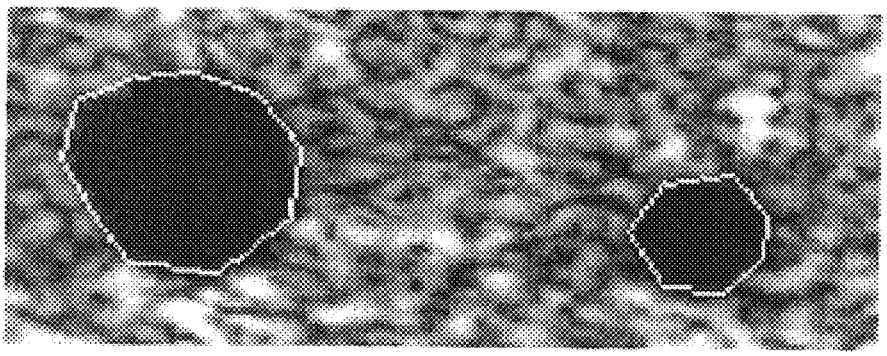
FIG. 11(d) shows the final contour for a vertex spacing of r=25 pixels.

The effects of the contour resolution in the GDM model on the final segmentation are shown in FIG. 11. As the between-vertex resolution increases (i.e., poorer resolution), more smoothing results as seen in the sequence from (a) to (d). However, if the resolution is allowed to be too large, the contour begins to lose its ability to closely follow the object boundary, as in (d). This is exemplified by the areas enclosed within the contours. For the left contour, the area decreased only slightly from 17.84 mm$^2$ for no GDM application (FIG. 11(a)) to 17.79 mm$^2$ for a vertex spacing of 8 pixels (FIG. 11(b)), and to 17.34 mm$^2$ when a vertex spacing of 15 pixels (FIG. 11(c)) was applied. However, for a vertex spacing of 25 pixels (FIG. 11(d)), an even larger decrease to 15.55 mm$^2$ occurred, as the spacings were too large and the model became too stiff for the contour to properly follow the boundary.

The results for the segmentation time revealed that the determination of the initial contour for the entire vessel (200 slices) required only 21 seconds for each of the phantoms. To obtain a smoothed final contour for all slices in the phantom through the application of the GDM required only 4 additional seconds, due to the very few iterations (about 8) needed to bring the initial contours to a minimum energy configuration (FIG. 7(c)).

The average and standard deviation of the difference between the initial and final contours for each of the branches in each of the vessels is shown in Table III.

TABLE III

Mean ($\Delta$) and standard deviation ($\sigma(\Delta)$) of the difference in area (mm$^2$) between initial and final contours of each branch of each of the stenosed vessels. Branch 1 is the common, 2 the internal and 3 the external carotid.

| Stenosis severity | 30% | | | 60% | | | 70% | | |
|---|---|---|---|---|---|---|---|---|---|
| Branch | 1 | 2 | 3 | 1 | 2 | 3 | 1 | 2 | 3 |
| $\Delta$ (mm$^2$) | 0.23 | 0.39 | 0.36 | 0.23 | 0.41 | 0.34 | 0.33 | 0.20 | 0.38 |
| $\sigma(\Delta)$ (mm$^2$) | 0.31 | 0.20 | 0.30 | 0.58 | 0.23 | 0.27 | 0.26 | 0.27 | 0.21 |

The average difference was small, varying between 0.2 to 0.41 mm for each slice. This demonstrates that although the GDM smoothed the contour, it reduced the area by only a very small amount that was approximately equal to the standard deviation of the measurement.

Figure 12A:
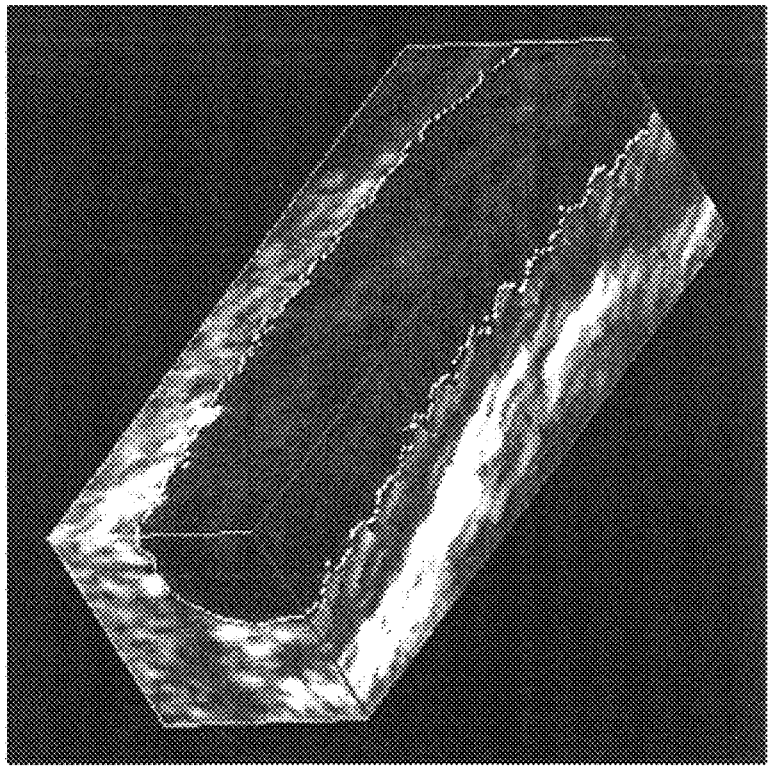
FIG. 12 shows the results of the segmentation method according to the present invention on patient carotids acquired with (a) a mechanical scanner and (b) a free-hand system using a magnetic positioning device.
Figure 12:
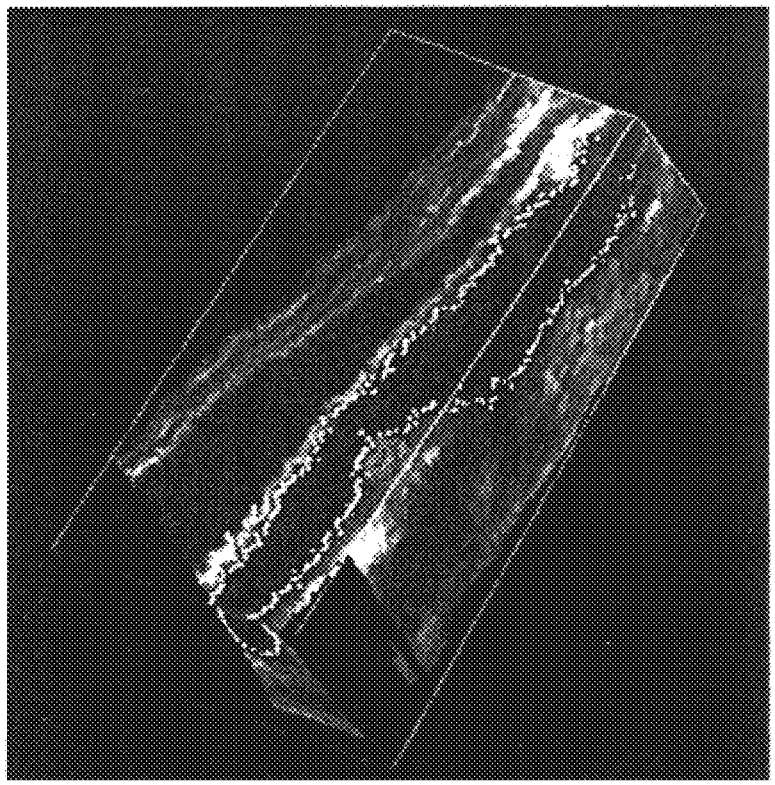

The results of the segmentation algorithm of the present invention applied to the images of the patient carotids are shown in FIGS. 12a and 12b, for the mechanically scanned and free-hand acquired images, respectively. From these it can be concluded that the algorithm is capable of withstanding small areas of shadowing. Because the 2-D GDM used does not provide smoothing between contours, any fluctuations between acquired 2-D images will not be smoothed. This can be observed in both FIGS. 12a and 12b, where fluctuations due to cardiac pulsations in the common carotid are present.

In summary, a fast, automated segmentation method is provided according to the present invention with minimal user interaction. The large variabilities that arise from user-defined initial contours have been eliminated, and experimental results have shown that the generated contours are insensitive to the placement within the vessel of the initial seed point needed to initiate the algorithm. The results of tests on carotid phantoms with a range of idealized stenoses showed a difference of 3% or less from the numerical model used in making the phantoms. Exceptional speed was achieved in the initialization of the contour through the use of simple search techniques to identify a small number of candidate boundary points, which are further analyzed and compared using easily calculated features for each candidate. Testing has shown that a total of only 25 seconds was needed for the analysis of a 200 slice, 23 MB volume on a 9500 Power Macintosh prototype running at 100 MHz.

Other embodiments and variations of the invention are contemplated. According to the current best mode, the candidates are compared through a simplistic weighting of their features. This technique works well for the images of phantoms and human carotids discussed herein above. However, in order to extend the use of the algorithm to a wider range of images of differing quality, additional edge features may be required, as well as a more explicit knowledge-based analysis of feature combinations. A neural network is well suited for this application, as it allows for a non-linear weighting of the features to be learned. Additionally, the neural network could simultaneously be presented with data from previously selected candidates in adjacent rays, both in the current slice as well as adjacent slices, giving it a larger and more regional view in the learning and scoring of boundary candidates. The initial contour generation presently uses data from three slices, while the GDM minimizes the contour's energy with data in the current slice only, without regard to continuity in the third dimension. To maintain and enhance the limited 3-D continuity of the initial contours, the GDM model can be extended to 3-D. This would provide increased robustness, enabling the contour to better overcome large areas of shadow, speckle. and reflection, all of which are problems frequently encountered in imaging human carotids. Finally, with successful segmentation and the availability of the cross-sectional areas along the length of the vessel, the next step is to use this information to arrive at a quantitative measurement of stenosis. Currently, x-ray angiography is the method of choice for quantitative assessment. With angiography, stenosis is described as the ratio of the diameter at the point of greatest stenosis to that at a location distal to the stenosis. This measure has been found to be a good indicator for identifying those at increased risk for stroke. In x-ray imaging, the magnification factors of the imaged structure are widely varying and unknown, making it impossible to directly measure lumen size. One reason for taking the ratio of the two diameters is to cancel out the effects of the magnification. With ultrasound, it is difficult to obtain the same ratio measurement, as the jaw bone limits the viewing length along the carotid arteries. However, information on voxel dimensions is available and can be used in calculating the true lumen areas. The measurement for stenosis can thus simply be taken as the cross-sectional area at the point of greatest stenosis. The availability of such quantitative information can improve the diagnostic capabilities of ultrasound imaging, allowing it the potential for playing an increasing role in the monitoring of carotid disease progression.

A person skilled in the art of 3-D medical ultrasound imaging may conceive of other variations and modifications of the invention, all of which are believed to be within the sphere and scope of the invention as set forth in the appended claims.

What is claimed is:

1. An automated segmentation method for generating a surface contour from an ultrasound image of a fluid-filled region, comprising the steps of:
   a) identifying an initial contour by
      (i) specifying a single seed point approximately centrally in said ultrasound image of said fluid-filled region;
      (ii) extending a plurality of radial lines from said single seed point, each of said radial lines being characterized by an intensity profile derived from said image;
      (iii) performing a threshold analysis of said intensity profile for each of said radial lines and in response selecting a plurality of initial boundary point candidates along respective ones of said radial lines;
      (iv) comparing respective ones of said plurality of initial boundary point candidates along respective ones of said radial lines with further initial boundary point candidates along adjacent radial lines and selecting from among said plurality of initial boundary point candidates one boundary point per radial line which is continuous with said further initial boundary point candidates along said adjacent radial lines, whereby said initial contour is identified as a set of selected boundary points connected by respective edges; and
   b) applying a geometrically deformable model to said initial contour for smoothing said edges and thereby generating said surface contour.

2. The method of claim 1, wherein said step of comparing respective ones of said plurality of initial boundary point candidates along respective ones of said radial lines is conducted with respect to two adjacent radial lines in a single 2-D plane of said image and with respect to three adjacent radial lines in each adjacent plane, such that a continuity constraint is imposed on selection of said one boundary point per radial line in three dimensions.

3. The method of claim 2, wherein individual ones of said plurality of radial lines extending from said single seed point are separated by 5°.

4. The method of claim 1, wherein said step of performing a threshold analysis of said intensity profile for each of said radial lines further includes evaluating said intensity profile at a plurality of thresholds and, in response, generating a multilevel binary tree of values wherein a "0" indicates a voxel intensity below one of said thresholds and a "1" indicates a voxel intensity greater than one of said thresholds.

5. The method of claim 4, wherein said thresholds are automatically selected for each one of said radial lines, thereby rendering said thresholds adaptive to variable properties of said image.

6. The method of claim 5, wherein said thresholds are calculated by identifying a voxel on said radial line characterized by maximum intensity, $I_m$, as occupying at least a portion of the initial boundary along said radial line, and selecting said thresholds such that said voxel occupies at least four levels of said multilevel binary tree.

7. The method of claim 6, wherein said thresholds, $T_i$, are calculated using an intensity value, $I_o$, at said seed point and said maximum intensity, $I_m$, as follows:

$$\Delta I = (I_m - I_o)/4$$

$$T_i = I_o + (i * \Delta I); i=1,2,3,4,5.$$

8. The method of claim 7, further comprising a step of increasing $\Delta I$ in the event of an excessive number of said boundary point candidates, according to $\Delta I=(I_m-I_o)/3$, and thereafter reevaluating said binary tree.

9. The method of claim 8, further comprising the steps of determining start position, length and number of levels of said binary tree occupied by said voxel., rating said voxel according to four criteria which are (i) edge position relative to said further additional boundary point candidates, (ii) number of levels of said binary tree occupied, (iii) edge length, and (iv) variance in the voxels along said radial line between the seed point and boundary point candidate, and in response selecting said one boundary point.

10. The method of claim 9, wherein, within a set of candidates in a radial line, each criterion is normalized across all candidates to give a value between 0 and 1, for ensuring that at least one candidate receives a maximum value in each of the criteria.

* * * * *